3 Sheets—Sheet 1.

L. HULL.

GAGE-LATHES.

No. 7,262. Reissued Aug. 15, 1876.

WITNESSES.

Thos. Fisher

S. N. Peirce

Lorenzo Hull

INVENTOR

M. PETERS, PHOTO-LITHOGRAPHER, WASHINGTON, D. C.

3 Sheets—Sheet 2.

L. HULL.

GAGE-LATHES.

No. 7,262. Reissued Aug. 15. 1876.

WITNESSES.

Thos. Fisher

S. N. Pierce

Linas Hull

INVENTOR.

N. PETERS, PHOTO-LITHOGRAPHER, WASHINGTON, D. C.

L. HULL.
GAGE-LATHES.
No. 7,262.
Reissued Aug. 15, 1876.
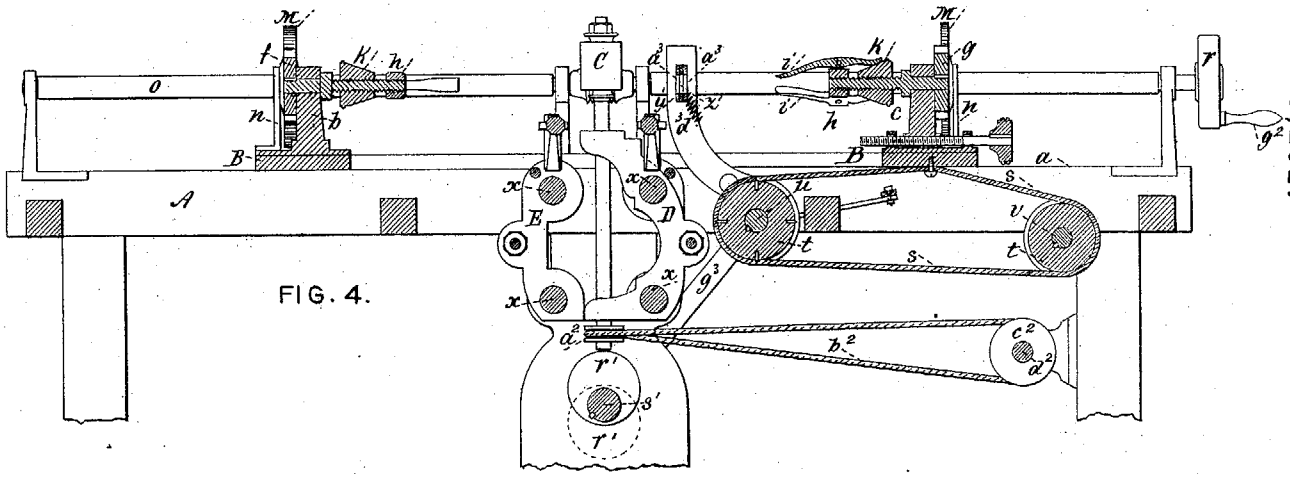
FIG. 4.
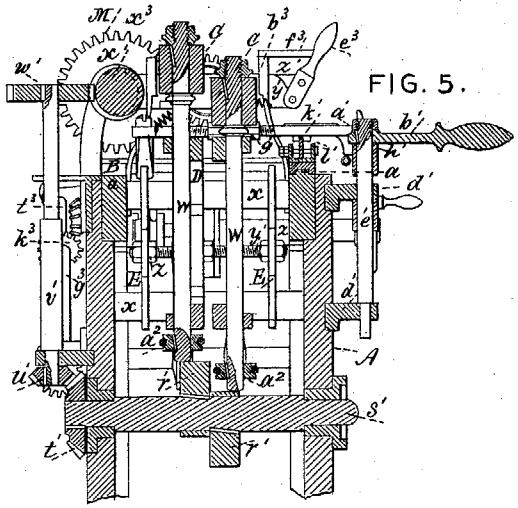
FIG. 5.
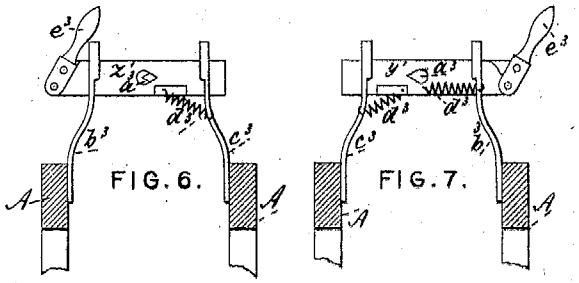
FIG. 6.
FIG. 7.
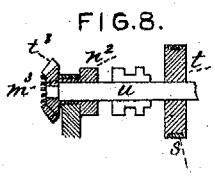
FIG. 8.
WITNESSES.
Chas. J. Fisher
S. N. Pierce
Lucius Hull
INVENTOR.
N. PETERS, PHOTO-LITHOGRAPHER, WASHINGTON, D. C.

UNITED STATES PATENT OFFICE.

LIVERAS HULL, OF CHARLESTOWN, ASSIGNOR TO THE AMERICAN WHIP COMPANY, OF WESTFIELD, MASSACHUSETTS.

IMPROVEMENT IN GAGE-LATHES.

Specification forming part of Letters Patent No. 53,003, dated March 6, 1866; reissue No. 7,262, dated August 15, 1876; application filed December 1, 1875.

*To all whom it may concern:*

Be it known that I, LIVERAS HULL, of Charlestown, county of Middlesex and State of Massachusetts, have invented a new and useful Machine for Dressing Whip Handles or Stocks, or other articles of like nature; and I do hereby declare the following to be a correct description thereof, when taken in connection with the accompanying drawings, in which—

Figure 2:
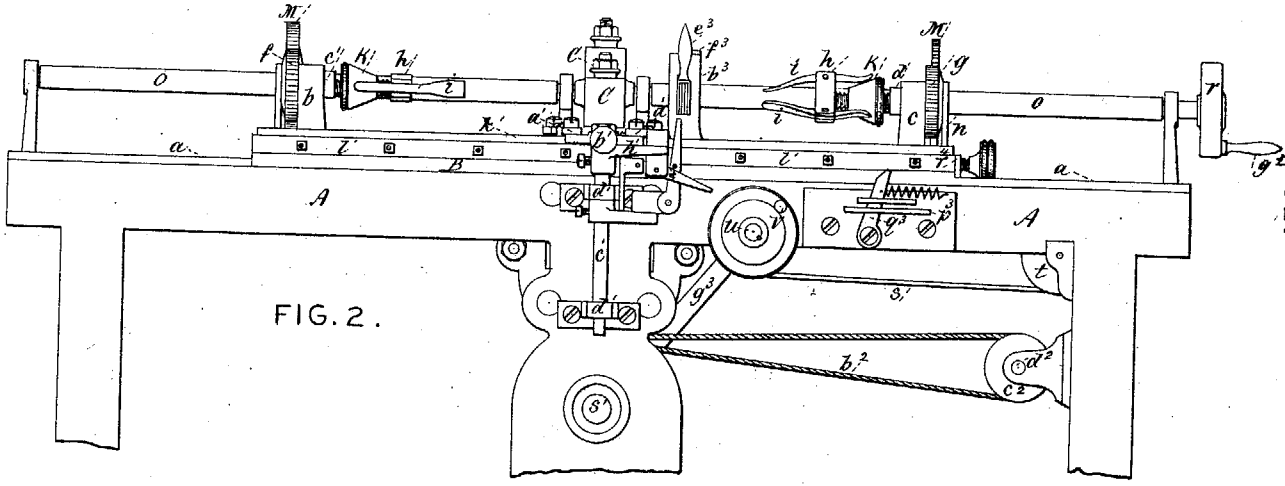
Figure 1:
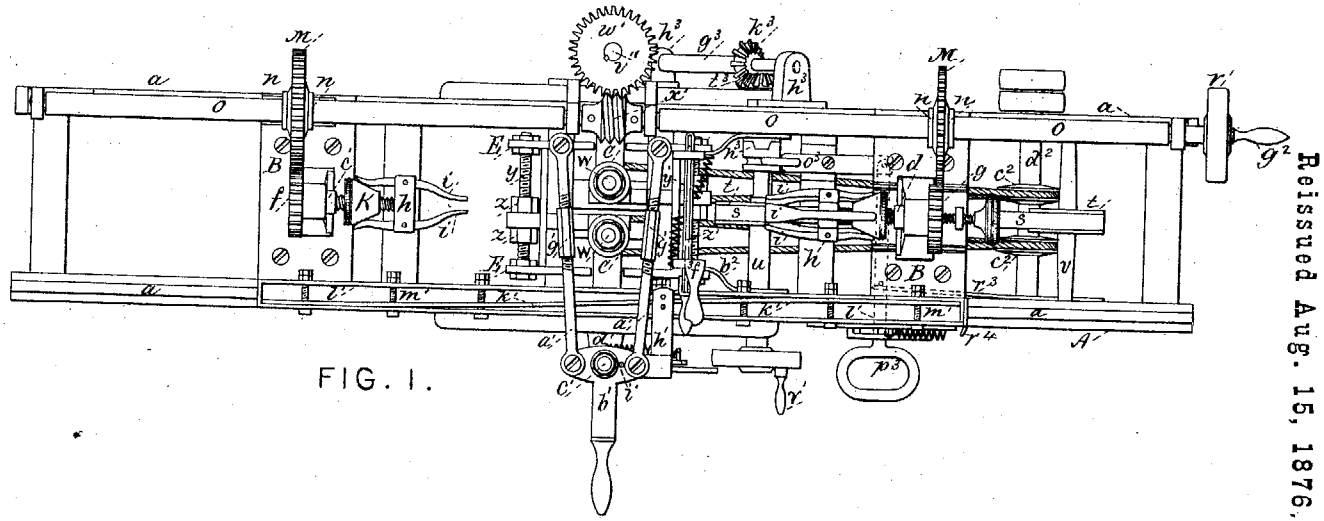

Figure 1 is a plan or top view of the machine; Fig. 2, a front elevation, Fig. 3 a rear elevation, Fig. 4 a longitudinal section, and Fig. 5 a transverse section, of it.

The object of this invention is to properly round and shape the handles or stocks of whips and other articles of a like nature. To accomplish such an object correctly it is necessary that the stock shall travel longitudinally toward the cutting-edges, or vice versa, so that the material removed from the stock may be stripped or cut lengthwise of the stock instead of around it or transversely, and so that the surface will be thereby left smooth. It is also essential that the proper taper or shape should be given to the stock at the same time that its surface is being finished; consequently it is necessary that the cutting devices be controlled by a guide corresponding to the taper or form of the stock; and, therefore, this invention consists, chiefly, in the combination of a holding and feeding mechanism, and revolving cutters, having their axis of rotation at right angles, or nearly so, to the axis of the stock, and guides for controlling the action of the cutters, as will hereinafter appear.

As shown in the drawings, the frame is represented at A, and is of any suitable form to support the other parts of the machine. Upon said frame is mounted a carriage, B, which is arranged to travel on guides or rails *a a*, for the purpose of giving longitudinal motion to the stock. Upon said carriage are mounted the standards *b c*, for supporting the mandrels $c^1$ or *d*, which hold the stock in proper position to be guided to the cutters. Said mandrels are rotated by suitable gearing *f g*, in such manner as to keep the stock constantly revolving while it is under the action of the cutters.

The means of attaching the stock to the mandrels is by clasping each end between a pair of levers, *i i*, which are pivoted on opposite sides of a head, *h*, which is mounted on the inner ends of the said mandrels, and thereby serves as a fulcrum to the levers, as also a means of revolving them.

Between the outer ends of each pair of said levers there is arranged a cone, K, which can be longitudinally adjusted by a screw formed on the mandrels, so as to spread or release the outer ends of the levers, and thereby close or open their inner ends, between which the opposite ends of the stock may be held in proper position to the cutters. The revolving-gear of said mandrels is shown at M M, engaging with the gears *f g*, arranged between the posts *n n* on the carriage. A shaft, *o*, imparts action to the said gears by a feather connection, which allows of their sliding on the shaft, and said shaft may be rotated either by a crank, $g^2$, or a belt and pulley. The standards *b* and *c* are capable of adjustment relatively to each other to adapt the machine to various lengths of stocks. The carriage or support that holds and moves the stock longitudinally is set in motion by a belt, S, on the wheels *t t*, which are fixed on the shafts *u v*, or it may be moved to and fro on one of said shafts by a crank, $v'$, upon the shaft *u*. The cutters or burrs are represented at C C, and, as shown, are mounted upon shafts W W, placed at right angles to the axis of the stock, or a line extending between the centers of the opposite clamping-levers *i i*. Said cutters or burrs are cylindrical heads, whose surfaces may be roughened as a file or rasp for cutting away the surface of the stock, as it passes between them or in close proximity to them, or one of them, for it is evident a single cutter may be used, working only on one side at a time, provided the stock be held in a sufficiently firm position. Said cutters, mounted on their shafts W W, are supported by adjustable frames D D, which are carried by two auxiliary frames, E E, that rest on cross-bars *x x x x*, as shown at Fig. 4. Each of the shafts W W is provided with a driving-pulley, $a^2$, and they are driven by a band, $b^2$, receiving motion from the pulleys $c^2$ $c^2$, which are on a shaft, $d^2$. Each of said auxiliary frames is provided with suitable mechanism for opening and closing the space between the cutters to vary the dimensions and form of the whip-stock, and the devices are under the control of a pattern-guide, which is shown at $k^1$, and which is connected with the cutters as follows: (but it is evident that the intermediate devices may be greatly varied without departing from the nature of my invention, as it is evident that the guide may be made to move instead of being fixed, as shown in the drawings.) Each of the auxiliary frames E E is provided with a set-screw, $y$, and adjusting-nuts Z Z, for adjusting the cutters relatively with the axis of the whip-stock.

Connected with said frames E E are connecting-links $a^1$ $a^1$, which are pivoted at one end to the frames D E, and at the other to a lever, $b^1$, having a T-shaped end, and supported on an axis which is supported in bearings $d^1$ $d^1$, as shown in Figs. 1, 2, and 5, and each of said connecting-links is made capable of adjustment by the nuts $g^1$. A bent lever, $h^1$, having an axis, $C^1$, as its fulcrum, is provided with a pin, $i^1$, by which it may be engaged with the T-ended lever $b^1$, and by which it may operate said lever $b^1$. The other end of the lever $h^1$ is provided with two pins, that clasp the pattern-guide $k^1$, which extends up like a flange between the pins, and is adjusted and held in a firm position by the set-screws $m^1$ $m^1$, which extend from the pattern-support $l'$, and which, in this case, is attached to the carriage or feeding mechanism, and travels with the stock, so that it is moved past the cutters, and its form determined by the form of the said pattern. The cutters are also arranged so as to be constantly changing their cutting-edges upon the stock, and thereby prevent their becoming worn into grooves, and from becoming clogged by such substances as whalebone, &c., of which the tips of stocks are often made. This change is effected by resting the shafts of the cutters upon levers which are operated by cam-wheels $r^1$ $r^1$ on the shaft $S^1$, which is provided with a pinion, $t^1$, which gears into the pinion $v'$, firmly fixed on the lower end of the vertical shaft $v''$.

A worm-gear, $w'$, on the shaft $v''$, engages with the worm $x'$ on the shaft O, and thereby motion is imparted to the cams to operate the levers, that gradually raise and lower the cutter-heads to change their position on the stock.

The whip-stock is supported near the cutters by passing it through notches or openings $a^3$ in two plates, $y'$ $z'$, as shown in Figs. 1, 6, and 7, which are arranged to slide one upon the other, so as to bring the openings $a^3$ into such relationship as to close upon the stock and steady it under the cutting action. Said plates work in the standards $b^3$ $c^3$, and are drawn endwise by a spring, $d^3$, attached to the plates and the standards.

The plates are also under the control of a lever, $e^3$, which is held by a catch, $f^3$, to hold the plates in such a position that the stock may be easily inserted or taken out, as desired.

The carriage may be moved automatically by gearing connected with it, similar to a planer, instead of by a crank, as already mentioned.

Figure 3:
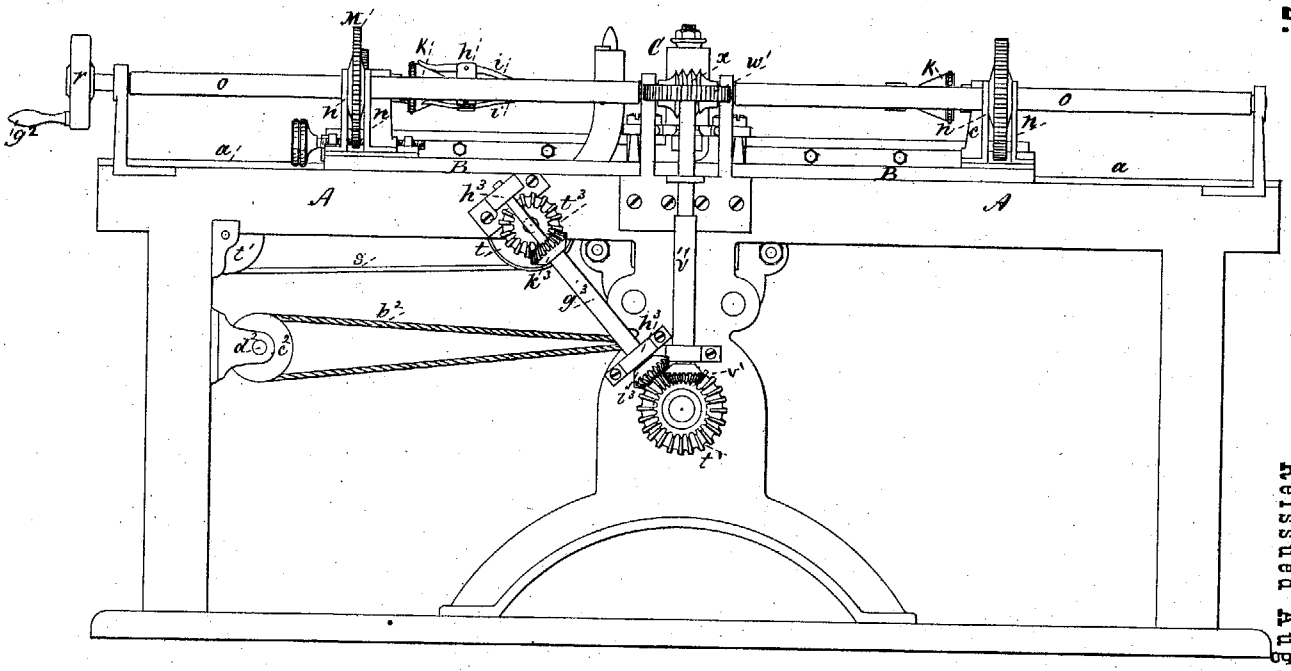

This mechanism is shown as consisting of a shaft, $g^3$, supported in bearings $h^3$ $h^3$, Fig. 3. Connected therewith is the bevel-gear $i^3$, on the lower end of the shaft, engaging with the pinion $t^1$. On the other end of shaft $g^3$ is another bevel-gear, $k^3$, which engages with a wheel, $t^3$, carried by the tubular shaft, $m^3$, (see Fig. 8, which is a vertical section of said shaft) and the shaft $u$ and clutch $w^3$; and said clutch is operated by a lever, $o^3$, which serves to connect the two shafts $u$ and $m^3$, and when so connected will cause the carriage to move forward. A handle, $p^3$, provided with a spring-latch, $q^3$, is attached to the clutch-lever $o^3$, to operate it to force the two parts of the clutch together, and a spring, $r^3$, attached to the frame A, and to the handle $p^3$, tends to force them apart whenever the spring-latch is released; and this is accomplished by a projection, $r^4$, upon the side of the carriage, striking the latch $q^3$ as the stock is completed, and it thereby stops the operation.

It is evident that the stock, in being rounded, will be carried endwise toward the cutters, and also rotated at the same time, and that the operation will be performed automatically.

I therefore claim—

1. In a machine for shaping whip-stocks, the combination of two rotating and adjustable clamps for holding the whip-stock with revolving cutters, whose axis of rotation is at right angles to the axis of the stock, substantially as described, for the object set forth.

2. In a machine for shaping whip-stock, the combination of revolving cutters, the adjustable and rotating clamps for holding and revolving the whip-stocks, and the guides though which the stock is passed for firmly holding the stock while being dressed by the cutters, as described.

3. In a machine for dressing whip-stocks, the combination with revolving cutters, whose axis of rotation is at right angles to the axis of the stock, of mechanism, such substantially as described, for moving the cutter or cutters in the direction of the axis of the same, as and for the object specified.

4. The adjustable rods or connecting-links $a^1$ $a^1$ with the cutter-frames or carriages D E, with levers $b^1$ and $h^1$, arranged to operate with the pattern-guide $k^1$, substantially as specified.

5. The combination of the straining or tension mechanism, with the rotating mandrels $c^1$ $d$, and their jaws for holding the whip-stock strained or taut, substantially as described.

Attest: LIVERAS HULL.

THO. I. FISHER,
I. N. PEIRCE.